Figure 1:
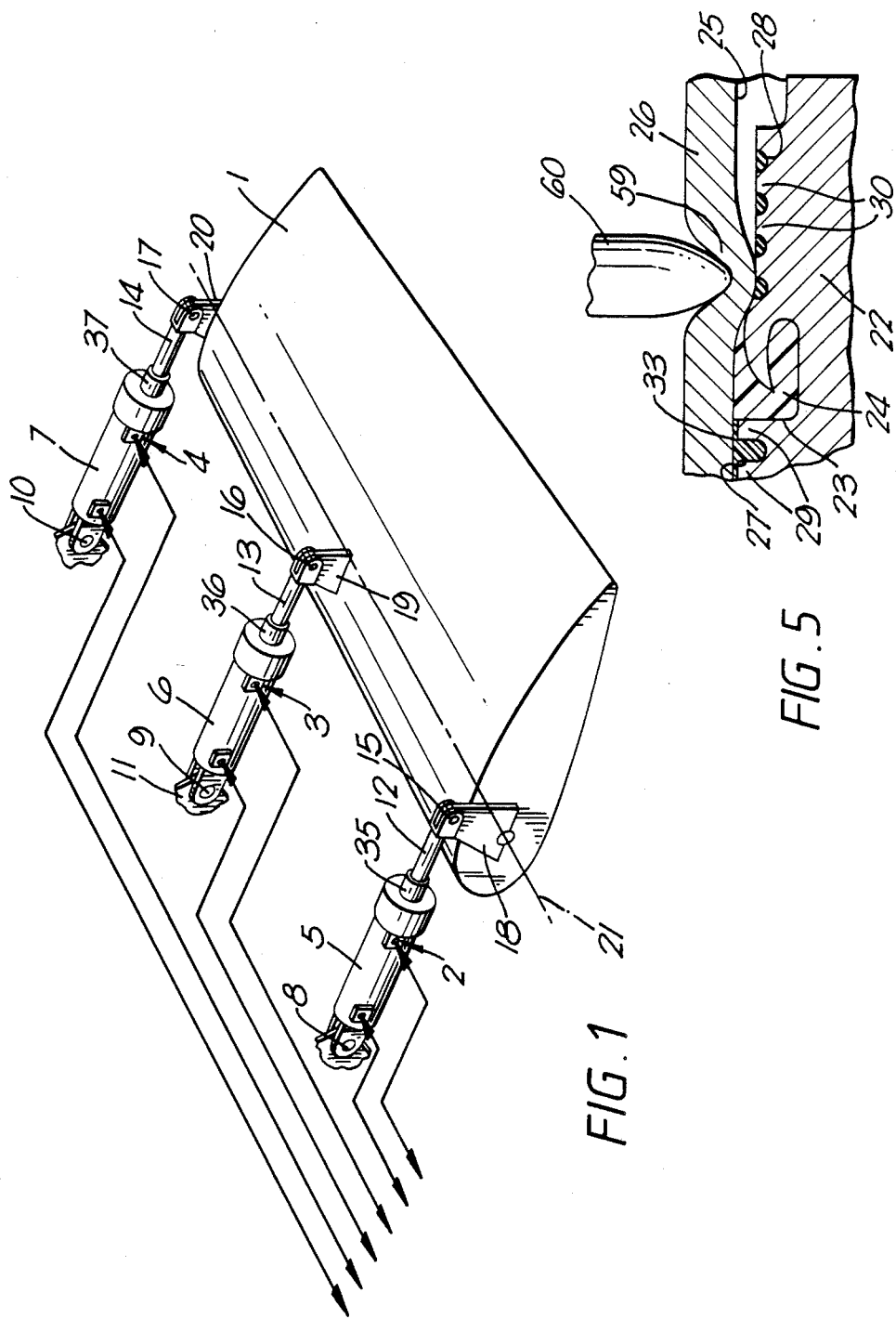

United States Patent [19]

Mountney et al.

[11] Patent Number: 4,739,695
[45] Date of Patent: Apr. 26, 1988

[54] FLUID-PRESSURE-OPERABLE ACTUATOR SYSTEMS

[75] Inventors: Arthur D. Mountney, Telford; James Roper, Codsall, both of England

[73] Assignee: Dowty Boulton Paul Limited, Wolverhampton, England

[21] Appl. No.: 852,133

[22] Filed: Apr. 15, 1986

[30] Foreign Application Priority Data

Apr. 30, 1985 [GB] United Kingdom ............... 8510913

[51] Int. Cl.$^4$ ........................................... F15B 15/08
[52] U.S. Cl. ........................................ 92/252; 277/58; 384/300
[58] Field of Search ............... 277/166, 203, 167, 165, 277/58; 384/296, 300; 92/252, 248

[56] References Cited

U.S. PATENT DOCUMENTS

| | | | |
|---|---|---|---|
| 661,683 | 11/1900 | Ball | 384/16 |
| 2,815,253 | 12/1957 | Spriggs | 384/300 X |
| 3,334,549 | 8/1967 | Sheldon | 277/188 R |
| 3,443,486 | 5/1969 | Lanmian | 92/252 X |
| 3,582,157 | 6/1971 | Hammon | 384/300 X |
| 3,884,127 | 5/1975 | Simmons | 92/151 |
| 4,052,112 | 10/1977 | Faber | 384/16 |

FOREIGN PATENT DOCUMENTS 1417589 12/1975 United Kingdom .
1584939 2/1981 United Kingdom .
2151306 7/1985 United Kingdom .

*Primary Examiner*—Alan Cohan
*Attorney, Agent, or Firm*—Hayes, Davis & Soloway

[57] ABSTRACT

A fluid-pressure-operable actuator system, for operating an aerodynamic control surface, including an actuator comprising a casing, piston and output member. Annular sealing means carried by the piston sealingly engages with the casing while annular sealing means disposed in an aperture through which the output member extends sealingly engages that member. Bearing means circumferentially flank the sealing means of the piston and/or the aperture and include parts of readily- and locally-deformable material, respectively in relatively-slidable load-bearing engagement with the casing and/or the output member. In the event that damage is sustained by the surface of the actuator engaged by the sealing means the bearing means is sufficiently deformed as to permit relative movement of the casing and output member to continue under the power of at least one other actuator associated with said control surface.

9 Claims, 3 Drawing Sheets

FLUID-PRESSURE-OPERABLE ACTUATOR SYSTEMS

This invention relates to fluid-pressure-operable actuator systems, for example those suitable for operating aerodynamic control surfaces of aeroplanes, helicopters, air-cushion vehicles and the like.

The actuator or actuators of such systems are susceptible in service to damage to the casings and/or output members thereof, due to impact by other equipment, mishandling or, when in military use, impact by projectiles and shell fragments which has often resulted in jamming of the actuators and thus malfunctioning of the associated control surfaces.

Hitherto, in order to overcome the effects of such damage, pistons and gland structure of the actuators have been provided with bendable and breakable portions designed to become detached from the main part of a piston or gland structure to permit the piston to pass a damaged portion of the casing or the damaged portion of an output member to pass a gland structure. The damage sustained has either been in the form of substantial deformation of the wall of the casing or of the surface of the output member, or has resulted from actual penetration by a projectile or fragment through the wall of the casing which has formed an abutment in the path of the piston of the actuator.

Usually at least one further actuator is arranged to assist said actuator in operating a control surface so that when one actuator is so damaged the other actuator or actuators continue to power the control surface, and because a said bendable and breakable portion, on engagement with or by the abutment caused by the deformation, projectile or fragment, becomes detached from the piston or gland structure, it has been intended that the components of the one actuator can continue their relative movement under the power of the further actuator or actuators associated with the respective control surface.

However there always remains the risk that when the bendable and breakable portion of the piston or gland structure so becomes detached it may so jam between components of the actuator as to prevent or severely impede relative movement of those components and thus prevent or severely impede operation of the further actuator or actuators connected to operate the control surface.

The invention as claimed is intended to provide a remedy. It solves the problem of how to design an actuator system in which the risk of such jamming of the components of an actuator is at least considerably reduced. The bearing means is adapted so that it can be deformed by foreign matter present in the actuator or by a deformity caused in the actuator, or in a surface of the actuator, by impingement of extraneous matter such as a bullet or projectile.

According to this invention a fluid-pressure-operable actuator system, suitable for operating an aerodynamic control surface, includes an actuator which comprises a casing, a piston slidably housed in said casing, an output member extending from said piston and projecting through an aperture in an end of said casing to the exterior thereof, annular sealing means carried by said piston and sealingly engaged with said casing, annular sealing means disposed in said aperture and sealingly engaged with said output member, and bearing means which circumferentially flank said sealing means of said piston and/or of said aperture and which include parts of readily-and locally-deformable material which, respectively, are in relatively-slidable load-bearing engagement with said casing and/or said output member whereby in the event that damage is sustained by, or foreign matter penetrates, a surface of said actuator engaged by said sealing means so that an abutment projects from that surface, said material of a said bearing means on engaging or being engaged by a said abutment is sufficiently deformed as to permit relative movement of said casing and said output member to continue under the power of at least one other actuator associated with said control surface.

Preferably said bearing means flank both sides of each said annular sealing means.

The bearing means may be of annular form and, at least in part, comprise a plastics or like material of non-brittle type for relative sliding engagement with said casing and/or said output member.

The said plastics or like material may be suitably keyed into a respective annular supporting member forming part of each said bearing means, that member being secured either to said piston or to said casing, as the case may be, or alternatively, being formed integrally with said piston or said casing. Each said supporting member may be provided with closely-spaced annular grooves for receiving said plastics or like material and with respect to which said material is in part bonded. Alternatively, each said supporting member may be provided with helical grooving for receiving said plastics or like material.

Where bearing means are provided for relative sliding movement with respect to said output member, the annular sealing means engageable with said output member and the associated said bearing means may together be part of a gland structure itself suitably secured in said casing. In this case said sealing means may comprise a plurality of axially-spaced annular sealing rings engageable with said output member and supporting in respective annular grooving in the bore of said gland structure, further annular grooving being disposed in said structure between said annular sealing rings and, also, inwardly of the innermost of those rings into which further annular grooving said plastics or like material of non-brittle type can be keyed, those parts of said material standing proud of said further grooving being in engagement with said output member.

The plastics or like material forming part of said bearing means may comprise polytetrafluoroethylene or alternatively polyamide, and the piston and the casing may be of steel.

The actuator system may comprise a plurality of said actuators which are arranged in parallel manner and each connected between fixed structure and a respective position on said control surface.

By the invention, should an actuator be damaged in service the other actuator or actuators also connected to the associated control surface can continue to operate that control surface unimpeded, or substantially unimpeded, by the damage sustained by the first actuator.

Figure 2:
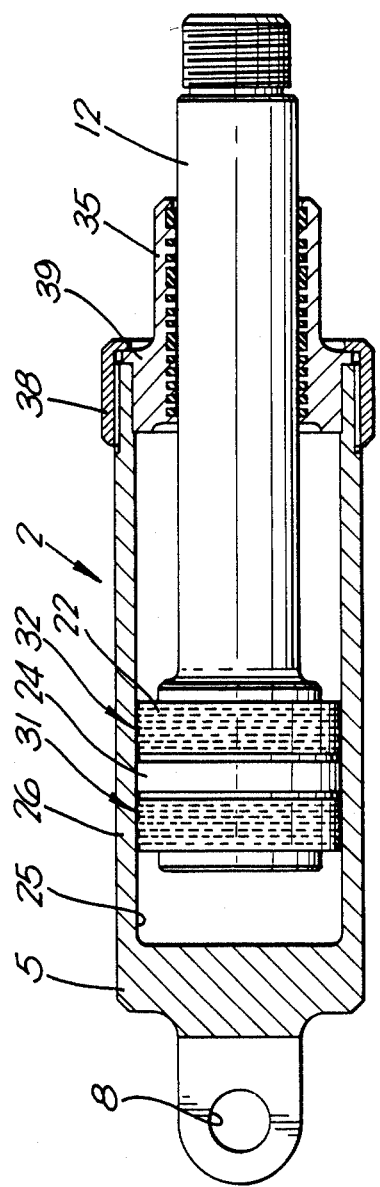
Figure 3:
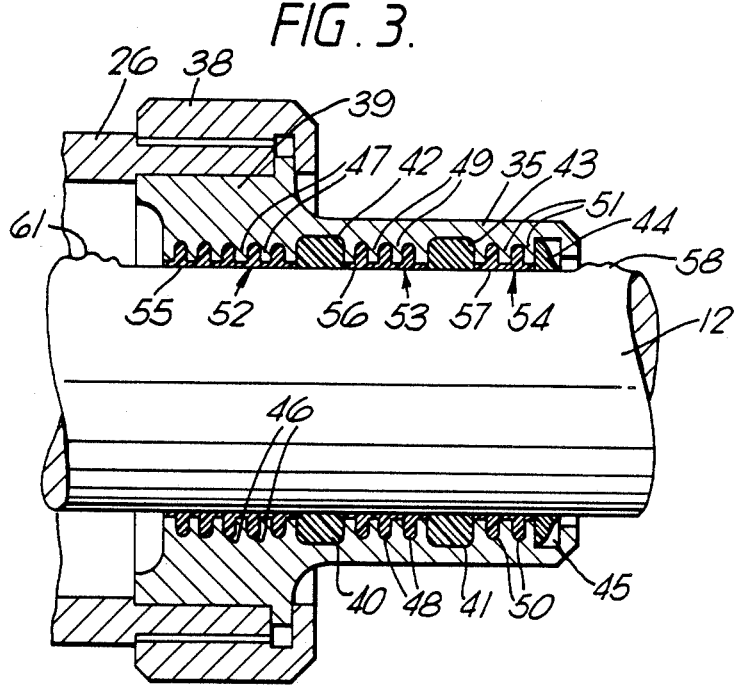
Figure 4:
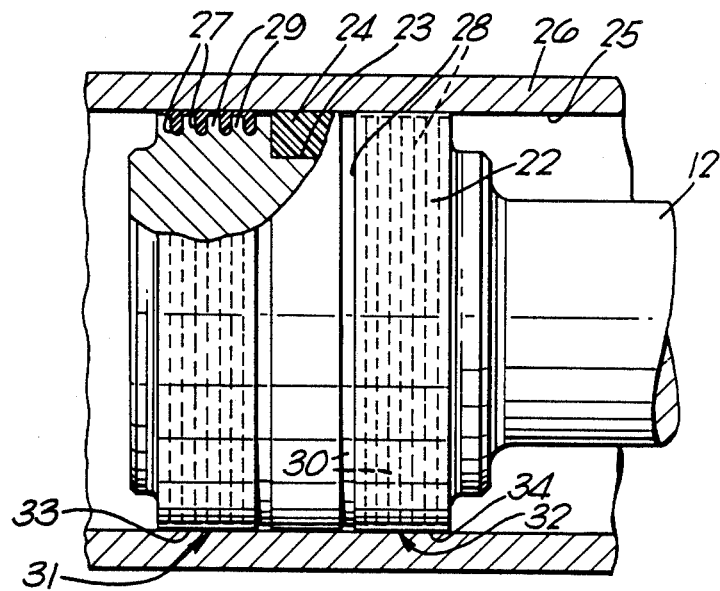

One way of carrying out the invention is described in detail below with reference to drawings which illustrate only one specific embodiment, in which:

FIG. 1 is a perspective view of an aerodynamic control surface to which three fluid-pressure-operable actuators, each such as shown in FIGS. 2 to 5, are connected, FIG. 2 is a cross-section of one of the three actuators shown in FIG. 1, FIG. 3 is an enlarged cross-section of part of the actuator shown in FIG. 2, FIG. 4 is an enlarged cross-section of another part of the actuator shown in FIG. 2, and FIG. 5 is a scrap cross-section taken on FIG. 4.

Referring to the drawings a fluid-pressure-operable actuator system for operating an aircraft control surface 1 includes three piston-and-cylinder telescopic actuators 2, 3, 4, the casings 5, 6, 7 of which are pivotally-connected at 8, 9, 10 to fixed aircraft structure 11. The output members or piston rods 12, 13, 14 of these actuators are each pivotally-connected at 15, 16, 17 to respective arms 18, 19, 20 carried by, and spaced apart along, the control surface 1 which is itself hinged to fixed structure about axis 21.

The steel piston 22 of each actuator 2, 3, 4 has a relatively wide centrally-disposed annular groove 23 which houses an annular sealing ring 24 of generally rectangular cross-section and of rubber or rubber-like material which is in relative sliding and fluid-sealing engagement with the inner wall 25 of the steel cylinder 26 of the actuator. To each side of groove 23 the steel piston is reduced in diameter and there provided with four relatively narrow and shallow annular grooves 27; 28 so that sets 29; 30 of five equally narrow radially-outwardly directed annular fins of steel are formed integrally with the piston on each side of groove 23. In this embodiment each groove 27; 28 and each fin 29; 30 has an axial thickness of approximately 0.040".

A bearing material, in this embodiment polytetrafluoroethylene, is united by a suitable bonding process to piston 22 to form two annular bearing means 31; 32 which flank groove 23 and its sealing ring 24. This material fills the grooves 27; 28 as shown and so stands proud thereof as to cover the circumferential edges of fins 29; 30 and presents cylindrical bearing surfaces 33; 34 to the inner wall 25 of cylinder 26.

The piston rod 12, 13, 14 of each actuator 2, 3, 4 extends outwardly of cylinder 26 and to the right in FIGS. 2 and 3 through an annular gland structure 35, 36, 37. Each gland structure is retained with respect to its cylinder 26 by an internally screw-threaded flanged ring 38 fitted to the cylinder. Thus the gland structure forms an end wall 39 for the cylinder and is so elongated as to protrude substantially in the direction outwardly of the cylinder.

Each gland structure is of steel and is provided in its bore with two relatively wide annular grooves 40, 41 each of which houses an annular sealing ring 42, 43 of generally rectangular cross-section and of rubber or rubber-like material which are in relative sliding and fluid-sealing engagement with the piston rod 12. An annular scraper ring 44, of the cross-section shown and also of rubber or rubber-like material, is seated in an annular groove 45 to the right in FIGS. 2 and 3 of ring 43 and is in engagement with the piston rod.

To the left of ring 42 the bore of gland structure 35, 36, 37 of each actuator is provided with five relatively narrow and shallow annular grooves 46 so that a set 47 of six narrow and annular fins are formed integrally with the gland structure. Between rings 42 and 43 three further relatively narrow and shallow annular grooves 48 are provided in the bore so that a further set 49 of four narrow and annular fins are formed integrally with the gland structure. Further, between rings 43 and 44 another two relatively narrow and shallow annular grooves 50 are provided in the bore so that yet a further set 51 of three narrow and annular fins are formed integrally with the gland structure. In this embodiment each of the grooves 46, 48, 50 and of the radially-inwardly directed fins 47, 49, 51 has an axial thickness of approximately 0.040".

Bearing material, again of polytetrafluoroethylene, is united by a suitable bonding process to the gland structure to form three annular bearing means 52, 53, 54. This material fills the respective grooves 46, 48, 50 as shown and so stands proud thereof as to cover the circumferential edges of the radially-inwardly directed fins 47, 49, 51 and presents cylindrical bearing surfaces 55, 56, 57 to the cylindrical surface of the piston rod.

Thus the bearing means 31, 32; 52, 53, 54 provide adequate capacity for accommodating the loads encountered during operation of the control surface 1 under the power of the parallel fluidpressure-operable actuators 2, 3, 4 and under the aerodynamic loads on that surface.

If, during such operation of the control surface, one of the simultaneously-operating actuators 2, 3, 4 suffers damage, for example in military combat, by a projectile, a shell fragment or a bullet which strikes the cylinder or the piston rod of that actuator, or other foreign matter inadvertently strikes a severe blow against either of them, such damage may be of the form shown at 58 in FIG. 3 or as shown at 59 in FIG. 5. The damage at 58 comprises local eruption of the surface of the piston rod, while the damage at 59 comprises local distortion or indentation of the inner wall 25 of the cylinder 26 or even actual penetration completely through the cylinder by the foreign matter. In each case the damage sustained results in an abutment being produced which projects from the surface of the piston rod, or, from the surface of the inner wall 25, which but for the present invention would prevent or seriously resist not only free-stroking of the damaged actuator but also the normal operation of the other actuators connected to surface 1.

However, by virtue of the provision of bearing means 31, 32; 52, 53, 54 of a material which is readily-and locally-deformable and by virtue of the manner in which that material is supported in grooves which themselves are spaced by relatively thin annular fins permitting such ready and local deformation of said bearing means, in the event of such damage being sustained by an actuator the risk of the other actuators being prevented from continuing in their normal operating mode is considerably reduced or is eliminated altogether.

If such damage occurs to the part of the piston rod projecting from the actuator cylinder then upon contraction of the actuator the abutment formed by the damage 58 on the surface of the rod firstly passes the scraper ring 44, probably causing damage to it, and then comes up against the readily-and locally-deformable polytetrafluoroethylene material of annular bearing means 54. This instantly deforms to accommodate the shape of the abutment locally formed by damage 58 thereby allowing the piston rod to move further to the left. If the damage is particularly excessive so that a relatively large abutment is formed on the piston rod the narrow and annular fins 51 have the ability themselves to deform locally to assist in permitting the continued movement of the piston rod. If necessary the piston rod can move so that the damage abutment also passes sealing ring 43, fins 49, sealing ring 42 and fins 47 as necessary. However the passage past the sealing rings 43, 42 may result in such damage to them that loss of fluid occurs from the actuator. In this case, and thereafter, the control surface 1 would be operable only under the full power of the other two actuators, but the ability of the bearing means 52, 53, 54 to accommodate the damage to the piston rod enables those other two actuators to continue their operation unhampered, or substantially unhampered, by the damaged piston rod.

If on operation of the control surface a shell fragment or a bullet 60 penetrates cylinder 26 or so strikes it that the wall of the cylinder is distorted as shown in FIG. 5 at 59, the piston and piston rod can continue to move with respect to the cylinder because, as with the bearing means in the gland structure, the polytetrafluoroethylene material, and if necessary the fins 29; 30 can deform locally to accommodate the distortion at 59 in the path of the piston. Such deformation would be likely to be accompanied by serious damage to the sealing ring 24 and thus the control surface would continue under the full power of only the other two actuators, but such operation would be unhampered, or substantially unhampered, by the damage sustained by the cylinder wall.

By virtue of the manner in which the polytetrafluoroethylene material is deformed and the manner in which the fins are themselves deformed, it is unlikely that any polytetrafluoroethylene or steel would break away from the bearing means, piston or gland structure and thus there remains little or no likelihood that any parts thereof could become jammed in the damaged actuator as seriously to resist, or prevent, operation of the other actuators of the system.

If a shell fragment or bullet passes completely through cylinder 26 and strikes the portion of the piston rod 12 within the cylinder, eruption of the surface of the rod may occur, for example at 61 in FIG. 3. In this case extension of the actuator would not be prevented because with movement of the piston and rod to the right the abutment formed at 61 on coming into engagement with bearing means 52 would deform the material thereof. As movement of the piston and rod to the right continues the abutment 61 would pass sealing ring 42, bearing means 53, sealing ring 43, bearing means 54 and scraper ring 44.

Thus the gland structure 35 is capable of permitting movement of the piston and rod in either direction in the event of damage at 58 and 61 to the rod.

The construction hereinbefore described with reference to the drawings is such that the bearing means 31, 32; 52, 53, 54 are of relatively large axial length to afford large bearing areas for the piston rod, avoiding the need to have piston rods extending from both sides of the piston and thus through both of the end walls of the cylinder.

Although in the embodiment above described with reference to the drawings the polytetrafluoroethylene material of the bearing means is bonded in annular grooves which are arranged in parallel manner, in alternative embodiments of the invention the polytetrafluoroethylene material of the bearing means may instead be bonded in helical grooves suitably formed in the piston and/or in the gland structure.

Further, although in the embodiment above described with reference to the drawings the metallic part of gland structure 35, providing an annular supporting member, is formed separately from cylinder 26 and secured thereto by ring 38, in other embodiments of the invention the metallic part of the gland structure is instead formed integrally with the cylinder and in this case the other end of the cylinder is provided with a removable end wall.

Again, although in the embodiment above described with reference to the drawings the plastics material for the bearing means is polytetrafluoroethylene, in alternative embodiments of the invention the material may instead be polyamide, or any other suitable plastics material, if necessary suitably reinforced in dependence on the operating loads expected.

Finally, although in the embodiment above-described with reference to the drawings the piston and its casing are of steel, in alternative embodiments of the invention the piston and/or the casing may be of titanium alloy or of aluminium alloy, or again may be of a suitable non-metallic material or a suitable non-metallic material reinforced by a suitable metallic or other non-metallic material, thus being of composite form.

We claim:

1. A fluid pressure operable actuator system in which an actuator comprises;
    a casing having an aperture therein;
    a piston slidably housed in said casing;
    an output member extending from said piston and through said aperture;
    first annular sealing means between said piston and said casing;
    second annular sealing means disposed in said aperture between said output member and said casing; and
    at least one circumferentially extending bearing means which flanks one of said annular sealing means, wherein said bearing means is in slidable engagement with a surface of said actuator and is readily deformable, by projections caused by extraneous matter, so as to allow relative movement between said piston and said casing when a deformity exists; said bearing means comprises a member of readily deformable material which is fitted into at least one circumferentially extending groove being defined by at least one readily deformable fin member.

2. A fluid pressure operable actuator system as claimed in claim 1, wherein said bearing means comprises a series of closely arranged annular grooves into which a number of members of readily deformable material are fitted and readily deformable fin members comprise of the material between adjacent annular grooves.

3. A fluid pressure operable actuator system as claimed in claim 1, wherein said bearing means comprises a helical groove into which at least one member of readily deformable material is fitted and which groove defines the readily deformable fin member.

4. A fluid pressure operable actuator system as claimed in claim 1, wherein said bearing means are provided on both sides of both of said annular sealing means.

5. A fluid pressure operable actuator system as claimed in claim 2, wherein said member of readily deformable material of said bearing means is of annular form and comprises a non-brittle plastics material.

6. A fluid pressure operable actuator system as claimed in claim 5, wherein said bearing means is provided for relative sliding movement with respect to the output member, and said second annular sealing means, engageable with said output member, and the associated bearing means together form part of a gland structure secured to said casing.

7. A fluid pressure operable actuator system as claimed in claim 16, wherein said annular sealing means comprise a plurality of annular sealing rings engageable with said output member and supported in annular grooving formed in a bore of said gland structure and further annular grooving is disposed in the structure between the annular sealing rings.

8. A fluid pressure operable actuator system as claimed in claim 5, wherein said plastics material forming part of said bearing means comprises polytetrafluoroethylene.

9. A fluid pressure operable actuator system as claimed in claim 5, wherein said plastics material forming part of said bearing means comprises polyamide.

* * * * *